United States Patent
Yamada

(10) Patent No.: US 8,299,981 B2
(45) Date of Patent: Oct. 30, 2012

(54) DRIVING METHOD OF PLASMA DISPLAY DEVICE

(75) Inventor: Kazuhiro Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/809,723

(22) PCT Filed: Dec. 7, 2009

(86) PCT No.: PCT/JP2009/006652
§ 371 (c)(1),
(2), (4) Date: Jun. 21, 2010

(87) PCT Pub. No.: WO2010/067567
PCT Pub. Date: Jun. 17, 2010

(65) Prior Publication Data
US 2011/0227954 A1   Sep. 22, 2011

(30) Foreign Application Priority Data
Dec. 9, 2008  (JP) .................................. 2008-312868

(51) Int. Cl.
*G09G 3/28* (2006.01)
(52) U.S. Cl. ......................................... 345/60; 345/690
(58) Field of Classification Search .............. 345/60–72, 345/204, 690; 315/169.4
See application file for complete search history.

(56) References Cited

U.S. PATENT DOCUMENTS

| | | | |
|---|---|---|---|
| 6,911,963 B2 * | 6/2005 | Baba et al. | 345/88 |
| 2002/0190940 A1 * | 12/2002 | Itoh et al. | 345/87 |
| 2008/0062075 A1 * | 3/2008 | Seo et al. | 345/60 |

FOREIGN PATENT DOCUMENTS

| | | |
|---|---|---|
| JP | 2000-066638 A | 3/2000 |
| JP | 2002-149109 A | 5/2002 |
| JP | 2006-098618 A | 4/2006 |
| JP | 2006098618 A | 4/2006 |
| JP | 2008-165045 A | 7/2008 |
| JP | 2008165045 A | 7/2008 |
| JP | 2008-197430 A | 8/2008 |
| JP | 2008197430 A | 8/2008 |

OTHER PUBLICATIONS

International Search Report for International Application No. PCT/JP2009/006652, Dec. 28, 2009, Panasonic Corporation.

* cited by examiner

*Primary Examiner* — Stephen Sherman
(74) *Attorney, Agent, or Firm* — RatnerPrestia

(57) ABSTRACT

The driving method of the plasma display device has a plurality of combination sets for display that includes a different number of combinations. The signal levels of a red image signal, a green image signal, and a blue image signal are compared with each other. For an image signal of a color that has a low signal level, a combination set for display is used where the number of combinations is smaller than that in the combination set for display used for an image signal of a color that has a high signal level.

6 Claims, 17 Drawing Sheets

FIG. 5A

Gradation for display / Hamming distance

| | SF1 (1) | SF2 (2) | SF3 (3) | SF4 (6) | SF5 (11) | SF6 (18) | SF7 (30) | SF8 (44) | SF9 (60) | SF10 (81) | |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 2 | 0 | 1 | 0 | 0 | 0 | 0 | 0 | 0 | 0 | 0 | 2 |
| 3 | 1 | 1 | 0 | 0 | 0 | 0 | 0 | 0 | 0 | 0 | 1 |
| 4 | 1 | 0 | 1 | 0 | 0 | 0 | 0 | 0 | 0 | 0 | 2 |
| 5 | 0 | 1 | 1 | 0 | 0 | 0 | 0 | 0 | 0 | 0 | 2 |
| 6 | 1 | 1 | 1 | 0 | 0 | 0 | 0 | 0 | 0 | 0 | 1 |
| 7 | 1 | 0 | 0 | 1 | 0 | 0 | 0 | 0 | 0 | 0 | 3 |
| 8 | 0 | 1 | 0 | 1 | 0 | 0 | 0 | 0 | 0 | 0 | 2 |
| 9 | 1 | 1 | 0 | 1 | 0 | 0 | 0 | 0 | 0 | 0 | 1 |
| 10 | 1 | 0 | 1 | 1 | 0 | 0 | 0 | 0 | 0 | 0 | 2 |
| 11 | 0 | 1 | 1 | 1 | 0 | 0 | 0 | 0 | 0 | 0 | 2 |
| 12 | 1 | 1 | 1 | 1 | 0 | 0 | 0 | 0 | 0 | 0 | 1 |
| 14 | 1 | 1 | 0 | 0 | 1 | 0 | 0 | 0 | 0 | 0 | 3 |
| 15 | 1 | 0 | 1 | 0 | 1 | 0 | 0 | 0 | 0 | 0 | 2 |
| 16 | 0 | 1 | 1 | 0 | 1 | 0 | 0 | 0 | 0 | 0 | 2 |
| 17 | 1 | 1 | 1 | 0 | 1 | 0 | 0 | 0 | 0 | 0 | 1 |
| 18 | 1 | 0 | 0 | 1 | 1 | 0 | 0 | 0 | 0 | 0 | 3 |
| 19 | 0 | 1 | 0 | 1 | 1 | 0 | 0 | 0 | 0 | 0 | 2 |
| 20 | 1 | 1 | 0 | 1 | 1 | 0 | 0 | 0 | 0 | 0 | 1 |
| 21 | 1 | 0 | 1 | 1 | 1 | 0 | 0 | 0 | 0 | 0 | 2 |
| 22 | 0 | 1 | 1 | 1 | 1 | 0 | 0 | 0 | 0 | 0 | 2 |
| 23 | 1 | 1 | 1 | 1 | 1 | 0 | 0 | 0 | 0 | 0 | 1 |
| 24 | 1 | 1 | 1 | 0 | 0 | 1 | 0 | 0 | 0 | 0 | 3 |
| 25 | 1 | 0 | 0 | 1 | 0 | 1 | 0 | 0 | 0 | 0 | 3 |
| 27 | 1 | 1 | 0 | 1 | 0 | 1 | 0 | 0 | 0 | 0 | 1 |
| 28 | 1 | 0 | 1 | 1 | 0 | 1 | 0 | 0 | 0 | 0 | 2 |
| 30 | 1 | 1 | 1 | 1 | 0 | 1 | 0 | 0 | 0 | 0 | 1 |
| 32 | 1 | 1 | 0 | 0 | 1 | 1 | 0 | 0 | 0 | 0 | 3 |
| 33 | 1 | 0 | 1 | 0 | 1 | 1 | 0 | 0 | 0 | 0 | 2 |
| 35 | 1 | 1 | 1 | 0 | 1 | 1 | 0 | 0 | 0 | 0 | 1 |
| 36 | 1 | 0 | 0 | 1 | 1 | 1 | 0 | 0 | 0 | 0 | 3 |
| 38 | 1 | 1 | 0 | 1 | 1 | 1 | 0 | 0 | 0 | 0 | 1 |
| 39 | 1 | 0 | 1 | 1 | 1 | 1 | 0 | 0 | 0 | 0 | 2 |
| 41 | 1 | 1 | 1 | 1 | 1 | 1 | 0 | 0 | 0 | 0 | 1 |

FIG. 5B

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 42 | 1 | 1 | 1 | 1 | 0 | 0 | 1 | 0 | 0 | 0 | 3 |
| 44 | 1 | 1 | 0 | 0 | 1 | 0 | 1 | 0 | 0 | 0 | 3 |
| 47 | 1 | 1 | 1 | 0 | 1 | 0 | 1 | 0 | 0 | 0 | 1 |
| 50 | 1 | 1 | 0 | 1 | 1 | 0 | 1 | 0 | 0 | 0 | 2 |
| 53 | 1 | 1 | 1 | 1 | 1 | 0 | 1 | 0 | 0 | 0 | 1 |
| 54 | 1 | 1 | 1 | 0 | 0 | 1 | 1 | 0 | 0 | 0 | 3 |
| 57 | 1 | 1 | 0 | 1 | 0 | 1 | 1 | 0 | 0 | 0 | 2 |
| 60 | 1 | 1 | 1 | 1 | 0 | 1 | 1 | 0 | 0 | 0 | 1 |
| 62 | 1 | 1 | 0 | 0 | 1 | 1 | 1 | 0 | 0 | 0 | 3 |
| 65 | 1 | 1 | 1 | 0 | 1 | 1 | 1 | 0 | 0 | 0 | 1 |
| 68 | 1 | 1 | 0 | 1 | 1 | 1 | 1 | 0 | 0 | 0 | 2 |
| 71 | 1 | 1 | 1 | 1 | 1 | 1 | 1 | 0 | 0 | 0 | 1 |
| 74 | 1 | 1 | 1 | 1 | 0 | 1 | 0 | 1 | 0 | 0 | 3 |
| 76 | 1 | 1 | 0 | 0 | 1 | 1 | 0 | 1 | 0 | 0 | 3 |
| 79 | 1 | 1 | 1 | 0 | 1 | 1 | 0 | 1 | 0 | 0 | 1 |
| 82 | 1 | 1 | 0 | 1 | 1 | 1 | 0 | 1 | 0 | 0 | 2 |
| 85 | 1 | 1 | 1 | 1 | 1 | 1 | 0 | 1 | 0 | 0 | 1 |
| 86 | 1 | 1 | 1 | 1 | 0 | 0 | 1 | 1 | 0 | 0 | 3 |
| 88 | 1 | 1 | 0 | 0 | 1 | 0 | 1 | 1 | 0 | 0 | 3 |
| 91 | 1 | 1 | 1 | 0 | 1 | 0 | 1 | 1 | 0 | 0 | 1 |
| 94 | 1 | 1 | 0 | 1 | 1 | 0 | 1 | 1 | 0 | 0 | 2 |
| 97 | 1 | 1 | 1 | 1 | 1 | 0 | 1 | 1 | 0 | 0 | 1 |
| 98 | 1 | 1 | 1 | 0 | 0 | 1 | 1 | 1 | 0 | 0 | 3 |
| 101 | 1 | 1 | 0 | 1 | 0 | 1 | 1 | 1 | 0 | 0 | 2 |
| 104 | 1 | 1 | 1 | 1 | 0 | 1 | 1 | 1 | 0 | 0 | 1 |
| 106 | 1 | 1 | 0 | 0 | 1 | 1 | 1 | 1 | 0 | 0 | 3 |
| 109 | 1 | 1 | 1 | 0 | 1 | 1 | 1 | 1 | 0 | 0 | 1 |
| 112 | 1 | 1 | 0 | 1 | 1 | 1 | 1 | 1 | 0 | 0 | 2 |
| 115 | 1 | 1 | 1 | 1 | 1 | 1 | 1 | 1 | 0 | 0 | 1 |
| 120 | 1 | 1 | 1 | 1 | 0 | 1 | 1 | 0 | 1 | 0 | 3 |
| 125 | 1 | 1 | 1 | 0 | 1 | 1 | 1 | 0 | 1 | 0 | 2 |
| 131 | 1 | 1 | 1 | 1 | 1 | 1 | 1 | 0 | 1 | 0 | 1 |
| 134 | 1 | 1 | 1 | 1 | 0 | 1 | 0 | 1 | 1 | 0 | 3 |
| 139 | 1 | 1 | 1 | 0 | 1 | 1 | 0 | 1 | 1 | 0 | 2 |
| 145 | 1 | 1 | 1 | 1 | 1 | 1 | 0 | 1 | 1 | 0 | 1 |
| 146 | 1 | 1 | 1 | 1 | 0 | 0 | 1 | 1 | 1 | 0 | 3 |

FIG. 5C

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 151 | 1 | 1 | 1 | 0 | 1 | 0 | 1 | 1 | 1 | 0 | 2 |
| 157 | 1 | 1 | 1 | 1 | 1 | 0 | 1 | 1 | 1 | 0 | 1 |
| 158 | 1 | 1 | 1 | 0 | 0 | 1 | 1 | 1 | 1 | 0 | 3 |
| 164 | 1 | 1 | 1 | 1 | 0 | 1 | 1 | 1 | 1 | 0 | 1 |
| 169 | 1 | 1 | 1 | 0 | 1 | 1 | 1 | 1 | 1 | 0 | 2 |
| 175 | 1 | 1 | 1 | 1 | 1 | 1 | 1 | 1 | 1 | 0 | 1 |
| 178 | 1 | 1 | 1 | 1 | 1 | 0 | 1 | 1 | 0 | 1 | 3 |
| 185 | 1 | 1 | 1 | 1 | 0 | 1 | 1 | 1 | 0 | 1 | 2 |
| 196 | 1 | 1 | 1 | 1 | 1 | 1 | 1 | 1 | 0 | 1 | 1 |
| 201 | 1 | 1 | 1 | 1 | 0 | 1 | 1 | 0 | 1 | 1 | 3 |
| 212 | 1 | 1 | 1 | 1 | 1 | 1 | 1 | 0 | 1 | 1 | 1 |
| 215 | 1 | 1 | 1 | 1 | 0 | 1 | 0 | 1 | 1 | 1 | 3 |
| 226 | 1 | 1 | 1 | 1 | 1 | 1 | 0 | 1 | 1 | 1 | 1 |
| 227 | 1 | 1 | 1 | 1 | 0 | 0 | 1 | 1 | 1 | 1 | 3 |
| 238 | 1 | 1 | 1 | 1 | 1 | 0 | 1 | 1 | 1 | 1 | 1 |
| 245 | 1 | 1 | 1 | 1 | 0 | 1 | 1 | 1 | 1 | 1 | 2 |
| 247 | 1 | 1 | 0 | 0 | 1 | 1 | 1 | 1 | 1 | 1 | 3 |
| 248 | 1 | 0 | 1 | 0 | 1 | 1 | 1 | 1 | 1 | 1 | 2 |
| 256 | 1 | 1 | 1 | 1 | 1 | 1 | 1 | 1 | 1 | 1 | 2 |

FIG. 5D

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 3 | 1 | 1 | 0 | 0 | 0 | 0 | 0 | 0 | 0 | 0 | 1 |
| 6 | 1 | 1 | 1 | 0 | 0 | 0 | 0 | 0 | 0 | 0 | 1 |
| 12 | 1 | 1 | 1 | 1 | 0 | 0 | 0 | 0 | 0 | 0 | 1 |
| 23 | 1 | 1 | 1 | 1 | 1 | 0 | 0 | 0 | 0 | 0 | 1 |
| 41 | 1 | 1 | 1 | 1 | 1 | 1 | 0 | 0 | 0 | 0 | 1 |
| 71 | 1 | 1 | 1 | 1 | 1 | 1 | 1 | 0 | 0 | 0 | 1 |
| 115 | 1 | 1 | 1 | 1 | 1 | 1 | 1 | 1 | 0 | 0 | 1 |
| 175 | 1 | 1 | 1 | 1 | 1 | 1 | 1 | 1 | 1 | 0 | 1 |
| 256 | 1 | 1 | 1 | 1 | 1 | 1 | 1 | 1 | 1 | 1 | 1 |

FIG. 8A

Gradation for display / Hamming distance

| | SF1 (1) | SF2 (2) | SF3 (3) | SF4 (6) | SF5 (11) | SF6 (18) | SF7 (30) | SF8 (44) | SF9 (60) | SF10 (81) | |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 2 | 0 | 1 | 0 | 0 | 0 | 0 | 0 | 0 | 0 | 0 | 2 |
| 3 | 1 | 1 | 0 | 0 | 0 | 0 | 0 | 0 | 0 | 0 | 1 |
| 4 | 1 | 0 | 1 | 0 | 0 | 0 | 0 | 0 | 0 | 0 | 2 |
| 5 | 0 | 1 | 1 | 0 | 0 | 0 | 0 | 0 | 0 | 0 | 2 |
| 6 | 1 | 1 | 1 | 0 | 0 | 0 | 0 | 0 | 0 | 0 | 1 |
| 7 | 1 | 0 | 0 | 1 | 0 | 0 | 0 | 0 | 0 | 0 | 3 |
| 8 | 0 | 1 | 0 | 1 | 0 | 0 | 0 | 0 | 0 | 0 | 2 |
| 9 | 1 | 1 | 0 | 1 | 0 | 0 | 0 | 0 | 0 | 0 | 1 |
| 10 | 1 | 0 | 1 | 1 | 0 | 0 | 0 | 0 | 0 | 0 | 2 |
| 11 | 0 | 1 | 1 | 1 | 0 | 0 | 0 | 0 | 0 | 0 | 2 |
| 12 | 1 | 1 | 1 | 1 | 0 | 0 | 0 | 0 | 0 | 0 | 1 |
| 14 | 1 | 1 | 0 | 0 | 1 | 0 | 0 | 0 | 0 | 0 | 3 |
| 15 | 1 | 0 | 1 | 0 | 1 | 0 | 0 | 0 | 0 | 0 | 2 |
| 16 | 0 | 1 | 1 | 0 | 1 | 0 | 0 | 0 | 0 | 0 | 2 |
| 17 | 1 | 1 | 1 | 0 | 1 | 0 | 0 | 0 | 0 | 0 | 1 |
| 18 | 1 | 0 | 0 | 1 | 1 | 0 | 0 | 0 | 0 | 0 | 3 |
| 19 | 0 | 1 | 0 | 1 | 1 | 0 | 0 | 0 | 0 | 0 | 2 |
| 20 | 1 | 1 | 0 | 1 | 1 | 0 | 0 | 0 | 0 | 0 | 1 |
| 21 | 1 | 0 | 1 | 1 | 1 | 0 | 0 | 0 | 0 | 0 | 2 |
| 22 | 0 | 1 | 1 | 1 | 1 | 0 | 0 | 0 | 0 | 0 | 2 |
| 23 | 1 | 1 | 1 | 1 | 1 | 0 | 0 | 0 | 0 | 0 | 1 |
| 24 | 1 | 1 | 1 | 0 | 0 | 1 | 0 | 0 | 0 | 0 | 3 |
| 25 | 1 | 0 | 0 | 1 | 0 | 1 | 0 | 0 | 0 | 0 | 3 |
| 27 | 1 | 1 | 0 | 1 | 0 | 1 | 0 | 0 | 0 | 0 | 1 |
| 28 | 1 | 0 | 1 | 1 | 0 | 1 | 0 | 0 | 0 | 0 | 2 |
| 30 | 1 | 1 | 1 | 1 | 0 | 1 | 0 | 0 | 0 | 0 | 1 |
| 32 | 1 | 1 | 0 | 0 | 1 | 1 | 0 | 0 | 0 | 0 | 3 |
| 33 | 1 | 0 | 1 | 0 | 1 | 1 | 0 | 0 | 0 | 0 | 2 |
| 35 | 1 | 1 | 1 | 0 | 1 | 1 | 0 | 0 | 0 | 0 | 1 |
| 36 | 1 | 0 | 0 | 1 | 1 | 1 | 0 | 0 | 0 | 0 | 3 |
| 38 | 1 | 1 | 0 | 1 | 1 | 1 | 0 | 0 | 0 | 0 | 1 |
| 39 | 1 | 0 | 1 | 1 | 1 | 1 | 0 | 0 | 0 | 0 | 2 |
| 41 | 1 | 1 | 1 | 1 | 1 | 1 | 0 | 0 | 0 | 0 | 1 |
| 42 | 1 | 1 | 1 | 1 | 0 | 0 | 1 | 0 | 0 | 0 | 3 |

FIG. 8B

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 44 | 1 | 1 | 0 | 0 | 1 | 0 | 1 | 0 | 0 | 0 | 3 |
| 47 | 1 | 1 | 1 | 0 | 1 | 0 | 1 | 0 | 0 | 0 | 1 |
| 50 | 1 | 1 | 0 | 1 | 1 | 0 | 1 | 0 | 0 | 0 | 2 |
| 53 | 1 | 1 | 1 | 1 | 1 | 0 | 1 | 0 | 0 | 0 | 1 |
| 54 | 1 | 1 | 1 | 0 | 0 | 1 | 1 | 0 | 0 | 0 | 3 |
| 57 | 1 | 1 | 0 | 1 | 0 | 1 | 1 | 0 | 0 | 0 | 2 |
| 60 | 1 | 1 | 1 | 1 | 0 | 1 | 1 | 0 | 0 | 0 | 1 |
| 62 | 1 | 1 | 0 | 0 | 1 | | | | | | |
| | | | | | | 0 | 0 | 0 | 1 |
| 158 | 1 | 1 | 1 | 0 | 0 | 1 | 1 | 1 | 1 | 0 | 3 |
| 164 | 1 | 1 | 1 | 1 | 0 | 1 | 1 | 1 | 1 | 0 | 1 |
| 169 | 1 | 1 | 1 | 0 | 1 | 1 | 1 | 1 | 1 | 0 | 2 |
| 175 | 1 | 1 | 1 | 1 | 1 | 1 | 1 | 1 | 1 | 0 | 1 |
| 178 | 1 | 1 | 1 | 1 | 1 | 0 | 1 | 1 | 0 | 1 | 3 |
| 185 | 1 | 1 | 1 | 1 | 0 | 1 | 1 | 1 | 0 | 1 | 2 |
| 196 | 1 | 1 | 1 | 1 | 1 | 1 | 1 | 1 | 0 | 1 | 1 |
| 201 | 1 | 1 | 1 | 1 | 0 | 1 | 1 | 0 | 1 | 1 | 3 |
| 212 | 1 | 1 | 1 | 1 | 1 | 1 | 1 | 0 | 1 | 1 | 1 |
| 215 | 1 | 1 | 1 | 1 | 0 | 1 | 0 | 1 | 1 | 1 | 3 |
| 226 | 1 | 1 | 1 | 1 | 1 | 1 | 0 | 1 | 1 | 1 | 1 |
| 227 | 1 | 1 | 1 | 1 | 0 | 0 | 1 | 1 | 1 | 1 | 3 |
| 238 | 1 | 1 | 1 | 1 | 1 | 0 | 1 | 1 | 1 | 1 | 1 |
| 245 | 1 | 1 | 1 | 1 | 0 | 1 | 1 | 1 | 1 | 1 | 2 |
| 247 | 1 | 1 | 0 | 0 | 1 | 1 | 1 | 1 | 1 | 1 | 3 |
| 248 | 1 | 0 | 1 | 0 | 1 | 1 | 1 | 1 | 1 | 1 | 2 |
| 256 | 1 | 1 | 1 | 1 | 1 | 1 | 1 | 1 | 1 | 1 | 2 |

FIG. 8C

Gradation for display / Hamming distance

| | SF1 (1) | SF2 (2) | SF3 (3) | SF4 (6) | SF5 (11) | SF6 (18) | SF7 (30) | SF8 (44) | SF9 (60) | SF10 (81) | |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 2 | 0 | 1 | 0 | 0 | 0 | 0 | 0 | 0 | 0 | 0 | 2 |
| 3 | 1 | 1 | 0 | 0 | 0 | 0 | 0 | 0 | 0 | 0 | 1 |
| 4 | 1 | 0 | 1 | 0 | 0 | 0 | 0 | 0 | 0 | 0 | 2 |
| 5 | 0 | 1 | 1 | 0 | 0 | 0 | 0 | 0 | 0 | 0 | 2 |
| 6 | 1 | 1 | 1 | 0 | 0 | 0 | 0 | 0 | 0 | 0 | 1 |
| 9 | 1 | 1 | 0 | 1 | 0 | 0 | 0 | 0 | 0 | 0 | 2 |
| 10 | 1 | 0 | 1 | 1 | 0 | 0 | 0 | 0 | 0 | 0 | 2 |
| 11 | 0 | 1 | 1 | 1 | 0 | 0 | 0 | 0 | 0 | 0 | 2 |
| 12 | 1 | 1 | 1 | 1 | 0 | 0 | 0 | 0 | 0 | 0 | 1 |
| 17 | 1 | 1 | 1 | 0 | 1 | 0 | 0 | 0 | 0 | 0 | 2 |
| 20 | 1 | 1 | 0 | 1 | 1 | 0 | 0 | 0 | 0 | 0 | 2 |
| 21 | 1 | 0 | 1 | 1 | 1 | 0 | 0 | 0 | 0 | 0 | 2 |
| 22 | 0 | 1 | 1 | 1 | 1 | 0 | 0 | 0 | 0 | 0 | 2 |
| 23 | 1 | 1 | 1 | 1 | 1 | 0 | 0 | 0 | 0 | 0 | 1 |
| 30 | 1 | 1 | 1 | 1 | 0 | 1 | 0 | 0 | 0 | 0 | 2 |
| 35 | 1 | 1 | 1 | 0 | 1 | 1 | 0 | 0 | 0 | 0 | 2 |
| 38 | 1 | 1 | 0 | 1 | 1 | 1 | 0 | 0 | 0 | 0 | 2 |
| 39 | 1 | 0 | 1 | 1 | 1 | 1 | 0 | 0 | 0 | 0 | 2 |
| 41 | 1 | 1 | 1 | 1 | 1 | 1 | 0 | 0 | 0 | 0 | 1 |
| 53 | 1 | 1 | 1 | 1 | 1 | 0 | 1 | 0 | 0 | 0 | 2 |
| 60 | 1 | 1 | 1 | 1 | 0 | 1 | 1 | 0 | 0 | 0 | 2 |
| 65 | 1 | 1 | 1 | 0 | 1 | 1 | 1 | 0 | 0 | 0 | 2 |
| 68 | 1 | 1 | 0 | 1 | 1 | 1 | 1 | 0 | 0 | 0 | 2 |
| 71 | 1 | 1 | 1 | 1 | 1 | 1 | 1 | 0 | 0 | 0 | 1 |
| 85 | 1 | 1 | 1 | 1 | 1 | 1 | 0 | 1 | 0 | 0 | 2 |
| 97 | 1 | 1 | 1 | 1 | 1 | 0 | 1 | 1 | 0 | 0 | 2 |
| 104 | 1 | 1 | 1 | 1 | 0 | 1 | 1 | 1 | 0 | 0 | 2 |
| 109 | 1 | 1 | 1 | 0 | 1 | 1 | 1 | 1 | 0 | 0 | 2 |
| 112 | 1 | 1 | 0 | 1 | 1 | 1 | 1 | 1 | 0 | 0 | 2 |
| 115 | 1 | 1 | 1 | 1 | 1 | 1 | 1 | 1 | 0 | 0 | 1 |
| 131 | 1 | 1 | 1 | 1 | 1 | 1 | 1 | 0 | 1 | 0 | 2 |
| 145 | 1 | 1 | 1 | 1 | 1 | 1 | 0 | 1 | 1 | 0 | 2 |
| 157 | 1 | 1 | 1 | 1 | 1 | 0 | 1 | 1 | 1 | 0 | 2 |

FIG. 8D

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 164 | 1 | 1 | 1 | 1 | 0 | 1 | 1 | 1 | 1 | 0 | 2 |
| 169 | 1 | 1 | 1 | 0 | 1 | 1 | 1 | 1 | 1 | 0 | 2 |
| 175 | 1 | 1 | 1 | 1 | 1 | 1 | 1 | 1 | 1 | 0 | 1 |
| 196 | 1 | 1 | 1 | 1 | 1 | 1 | 1 | 1 | 0 | 1 | 2 |
| 212 | 1 | 1 | 1 | 1 | 1 | 1 | 1 | 0 | 1 | 1 | 2 |
| 226 | 1 | 1 | 1 | 1 | 1 | 1 | 0 | 1 | 1 | 1 | 2 |
| 238 | 1 | 1 | 1 | 1 | 1 | 0 | 1 | 1 | 1 | 1 | 2 |
| 245 | 1 | 1 | 1 | 1 | 0 | 1 | 1 | 1 | 1 | 1 | 2 |
| 256 | 1 | 1 | 1 | 1 | 1 | 1 | 1 | 1 | 1 | 1 | 1 |

FIG. 8E

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 2 | 0 | 1 | 0 | 0 | 0 | 0 | 0 | 0 | 0 | 0 | 2 |
| 3 | 1 | 1 | 0 | 0 | 0 | 0 | 0 | 0 | 0 | 0 | 1 |
| 4 | 1 | 0 | 1 | 0 | 0 | 0 | 0 | 0 | 0 | 0 | 2 |
| 6 | 1 | 1 | 1 | 0 | 0 | 0 | 0 | 0 | 0 | 0 | 1 |
| 9 | 1 | 1 | 0 | 1 | 0 | 0 | 0 | 0 | 0 | 0 | 2 |
| 12 | 1 | 1 | 1 | 1 | 0 | 0 | 0 | 0 | 0 | 0 | 1 |
| 17 | 1 | 1 | 1 | 0 | 1 | 0 | 0 | 0 | 0 | 0 | 2 |
| 23 | 1 | 1 | 1 | 1 | 1 | 0 | 0 | 0 | 0 | 0 | 1 |
| 30 | 1 | 1 | 1 | 1 | 0 | 1 | 0 | 0 | 0 | 0 | 2 |
| 41 | 1 | 1 | 1 | 1 | 1 | 1 | 0 | 0 | 0 | 0 | 1 |
| 53 | 1 | 1 | 1 | 1 | 1 | 0 | 1 | 0 | 0 | 0 | 2 |
| 71 | 1 | 1 | 1 | 1 | 1 | 1 | 1 | 0 | 0 | 0 | 1 |
| 85 | 1 | 1 | 1 | 1 | 1 | 1 | 0 | 1 | 0 | 0 | 2 |
| 115 | 1 | 1 | 1 | 1 | 1 | 1 | 1 | 1 | 0 | 0 | 1 |
| 131 | 1 | 1 | 1 | 1 | 1 | 1 | 1 | 0 | 1 | 0 | 2 |
| 175 | 1 | 1 | 1 | 1 | 1 | 1 | 1 | 1 | 1 | 0 | 1 |
| 196 | 1 | 1 | 1 | 1 | 1 | 1 | 1 | 0 | 1 | 1 | 2 |
| 256 | 1 | 1 | 1 | 1 | 1 | 1 | 1 | 1 | 1 | 1 | 1 |

FIG. 8F

| Gradation for display | SF1 (1) | SF2 (2) | SF3 (3) | SF4 (6) | SF5 (11) | SF6 (18) | SF7 (30) | SF8 (44) | SF9 (60) | SF10 (81) | Hamming distance |
|---|---|---|---|---|---|---|---|---|---|---|---|
| 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 1 |
| 3 | 1 | 1 | 0 | 0 | 0 | 0 | 0 | 0 | 0 | 0 | 1 |
| 6 | 1 | 1 | 1 | 0 | 0 | 0 | 0 | 0 | 0 | 0 | 1 |
| 12 | 1 | 1 | 1 | 1 | 0 | 0 | 0 | 0 | 0 | 0 | 1 |
| 23 | 1 | 1 | 1 | 1 | 1 | 0 | 0 | 0 | 0 | 0 | 1 |
| 41 | 1 | 1 | 1 | 1 | 1 | 1 | 0 | 0 | 0 | 0 | 1 |
| 71 | 1 | 1 | 1 | 1 | 1 | 1 | 1 | 0 | 0 | 0 | 1 |
| 115 | 1 | 1 | 1 | 1 | 1 | 1 | 1 | 1 | 0 | 0 | 1 |
| 175 | 1 | 1 | 1 | 1 | 1 | 1 | 1 | 1 | 1 | 0 | 1 |
| 256 | 1 | 1 | 1 | 1 | 1 | 1 | 1 | 1 | 1 | 1 | 1 |

DRIVING METHOD OF PLASMA DISPLAY DEVICE

THIS APPLICATION IS A U.S. NATIONAL PHASE APPLICATION OF PCT INTERNATIONAL APPLICATION PCT/W2009/006652.

TECHNICAL FIELD

The present invention relates to a driving method of a plasma display device using an alternating-current (AC) type plasma display panel.

BACKGROUND ART

A plasma display panel (hereinafter referred to as "panel") typical as an image display device that has many pixels arranged in a plane shape has many discharge cells that have a scan electrode, a sustain electrode, and a data electrode. The panel excites a phosphor to emit light with gas discharge that is generated inside each discharge cell, and performs color display.

A plasma display device using such a panel mainly employs a subfield method as a method of displaying an image. In this method, one field period is formed of a plurality of subfields having a predetermined luminance weight, and an image is displayed by controlling light emission or no light emission in each discharge cell in each subfield.

The plasma display device has a scan electrode driving circuit for driving a scan electrode, a sustain electrode driving circuit for driving a sustain electrode, and a data electrode driving circuit for driving a data electrode. The driving circuit of each electrode of the plasma display device applies a required driving voltage waveform to each electrode. The data electrode driving circuit, based on an image signal, independently applies an address pulse for address operation to each of many data electrodes.

When the panel is seen from the side of the data electrode driving circuit, each data electrode serves as a capacitive load having a stray capacitance between it and an adjacent data electrode, scan electrode, and sustain electrode. Therefore, in order to apply a driving voltage waveform to each data electrode, charge and discharge of this capacitance must be required. As a result, the data electrode driving circuit requires power consumption for the charge and discharge.

The power consumption of the data electrode driving circuit increases as charge/discharge current of the capacitance possessed by the data electrode increases. This charge/discharge current largely depends on an image signal to be displayed. For instance, when an address pulse is applied to no data electrode, the charge/discharge current becomes "0" and hence the power consumption becomes minimum. Also when an address pulse is applied to all data electrodes, the charge/discharge current becomes "0" and hence the power consumption is small. When an address pulse is applied to data electrodes in a random fashion, the charge/discharge current becomes large and hence the power consumption also becomes large.

As a method of reducing the power consumption of the data electrode driving circuit, the following method or the like is disclosed. In this method, the power consumption of the data electrode driving circuit is calculated based on an image signal, for example. When the power consumption is large, an address operation is prohibited firstly in the subfield of the smallest luminance weight to restrict the power consumption of the data electrode driving circuit (for example, patent literature 1). Alternatively, a method or the like of decreasing the power consumption of the data electrode driving circuit by replacing an original image signal with an image signal for decreasing the power consumption of the data electrode driving circuit is disclosed (for example, patent literature 2).

The methods of patent literatures 1 and 2 are mainly used for preventing the plasma display device from failing when the power consumption excessively increases. Therefore, the methods of patent literatures 1 and 2 can largely damage the image display quality.

Recently, the power consumption of the data electrode driving circuit has steadily increased in response to enlargement in screen and enhancement in definition. Therefore, a power reducing method capable of being steadily used without sacrificing the image display quality has been demanded.

CITATION LIST

Patent Literature

[Patent Literature 1] Unexamined Japanese Patent Publication No. 2000-66638
[Patent Literature 2] Unexamined Japanese Patent Publication No. 2002-149109

SUMMARY OF THE INVENTION

A driving method of a plasma display device of the present invention has the following steps:
constituting one field period by a plurality of subfields having a predetermined luminance weight;
selecting a plurality of combinations from arbitrary combinations of the subfields; and
creating a combination set for display.
Using a combination of the subfields belonging to the combination set for display, the light emission or no light emission in a discharge cell is controlled and gradation is displayed.

The driving method of the plasma display device has the following steps. A plurality of combination sets having a different number of combinations is provided, and signal levels of a red image signal, a green image signal, and a blue image signal are compared with each other. For an image signal of a color that has a relatively low signal level, a combination set for display is used where the number of combinations is smaller than that in the combination set for display used for an image signal of a color that has a relatively high signal level.

This method can provide a driving method of the plasma display device capable of reducing the power consumption of the data electrode driving circuit without sacrificing the image display quality.

In the driving method of the plasma display device, preferably, the average value of hamming distances between certain gradations and the next smaller gradations in a combination set for display that has a small number of combinations is smaller than that in a combination set for display that has a large number of combinations.

The driving method of the plasma display device may have the following steps. The signal level of a red image signal is compared with that of a green image signal. For a red image signal where the ratio of the signal level to that of the green image signal is smaller than a predetermined constant, the following combination set for display is used. In this combination set, the number of combinations is smaller than that in the combination set for display used for the red image signal where the ratio of the signal level to that of the green image signal is the predetermined constant or larger.

The driving method of the plasma display device may have the following steps. The signal levels of a green image signal, a red image signal, and a blue image signal are compared with each other. For a green image signal where the ratio of the signal level to the higher one of the signal levels of the red image signal and the blue image signal is smaller than a predetermined constant, the following combination set for display is used. In this combination set, the number of combinations is smaller than that in the combination set for display used for the green image signal where the ratio of the signal level to the higher one of the signal levels of the red image signal and the blue image signal is the predetermined constant or larger.

The driving method of the plasma display device may have the following steps. The signal level of a blue image signal is compared with that of a green image signal. For a blue image signal where the ratio of the signal level to that of the green image signal is smaller than a predetermined constant, the following combination set for display is used. In this combination set, the number of combinations is smaller than that in the combination set for display used for the blue image signal where the ratio of the signal level to that of the green image signal is the predetermined constant or larger.

In the driving method of the plasma display device, for an image signal for displaying a moving image, a combination set for display may be used where the number of combinations is smaller than that in the combination set for display used for the image signal for displaying a still image.

BRIEF DESCRIPTION OF DRAWINGS

FIG. 5A is a diagram showing a coding table used in the plasma display device.

FIG. 5B is a diagram showing another coding table used in the plasma display device.

FIG. 5C is a diagram showing yet another coding table used in the plasma display device.

FIG. 5D is a diagram showing still another coding table used in the plasma display device.

FIG. 8A is a diagram showing a coding table used in a plasma display device in accordance with a second exemplary embodiment of the present invention.

FIG. 8B is a diagram showing another coding table used in the plasma display device in accordance with the second exemplary embodiment.

FIG. 8C is a diagram showing yet another coding table used in the plasma display device in accordance with the second exemplary embodiment.

FIG. 8D is a diagram showing still another coding table used in the plasma display device in accordance with the second exemplary embodiment.

FIG. 8E is a diagram showing yet another coding table used in the plasma display device in accordance with the second exemplary embodiment.

FIG. 8F is a diagram showing still another coding table used in the plasma display device in accordance with the second exemplary embodiment.

DETAILED DESCRIPTION OF PREFERRED EMBODIMENTS

First Exemplary Embodiment

Figure 1:
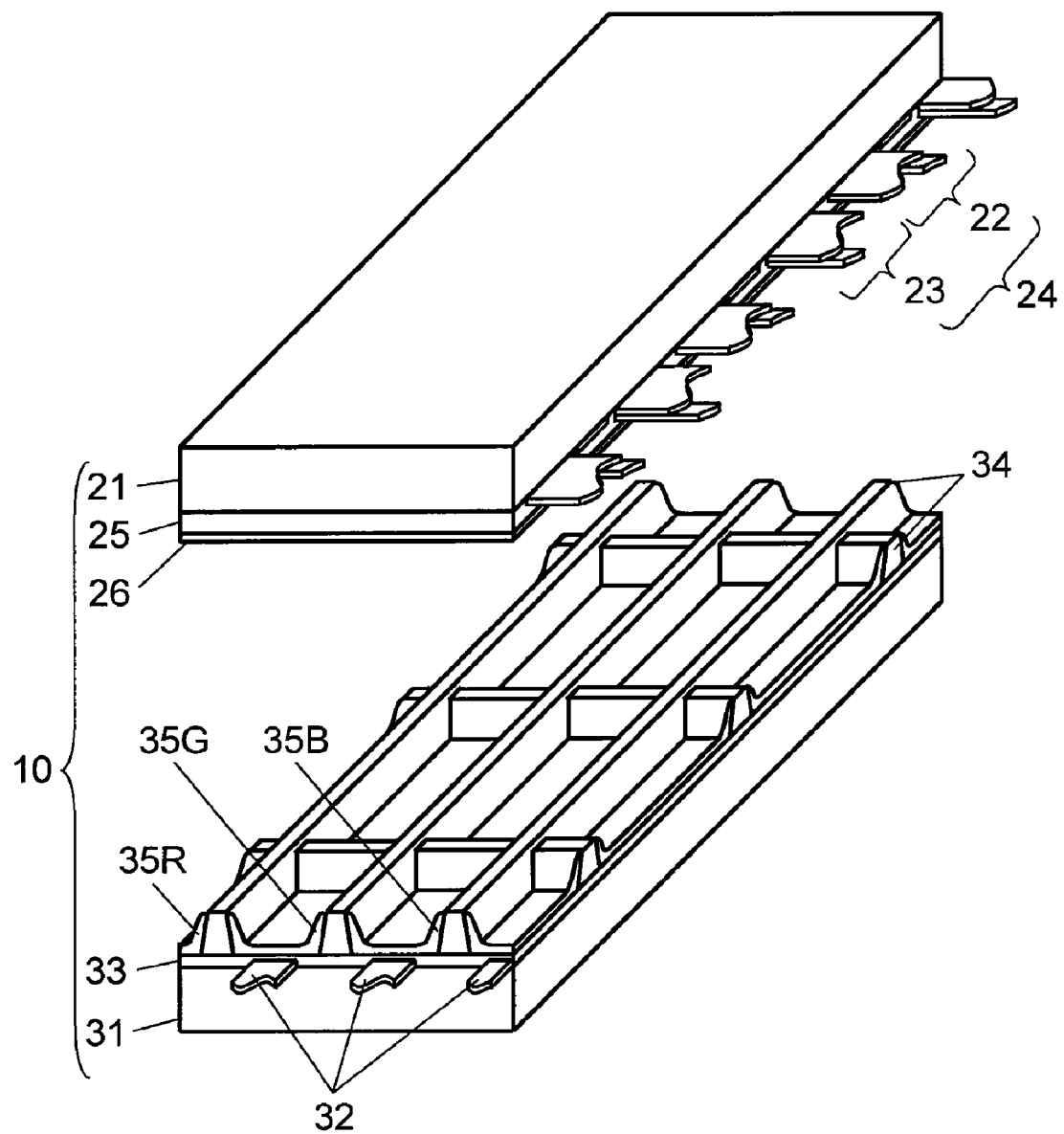
FIG. 1 is an exploded perspective view showing a structure of a panel of a plasma display device in accordance with a first exemplary embodiment of the present invention.

A plasma display device in accordance with exemplary embodiments of the present invention will be described hereinafter with reference to the accompanying drawings. FIG. 1 is an exploded perspective view showing a structure of panel 10 of the plasma display device in accordance with the first exemplary embodiment of the present invention. A plurality of display electrode pairs 24 formed of scan electrodes 22 and sustain electrodes 23 is disposed on glass-made front substrate 21. Dielectric layer 25 is formed so as to cover display electrode pairs 24, and protective layer 26 is formed on dielectric layer 25. A plurality of data electrodes 32 is formed on rear substrate 31, dielectric layer 33 is formed so as to cover data electrodes 32, and mesh barrier ribs 34 are formed on dielectric layer 33. Phosphor layer 35R for emitting red light, phosphor layer 35G for emitting green light, and phosphor layer 35B for emitting blue light are formed on the side surfaces of barrier ribs 34 and on dielectric layer 33.

Front substrate 21 and rear substrate 31 are faced to each other so that display electrode pairs 24 cross data electrodes 32 with a micro discharge space sandwiched between them, and the outer peripheries of them are sealed by a sealing material such as glass frit. The discharge space is filled with mixed gas of neon and xenon as discharge gas, for example. The discharge space is partitioned into a plurality of sections by barrier ribs 34. Discharge cells are formed in the intersecting parts of display electrode pairs 24 and data electrodes 32. The discharge cells discharge and emit light to display an image.

The structure of panel 10 is not limited to the abovementioned one, but may have striped barrier ribs, for example.

Figure 2:
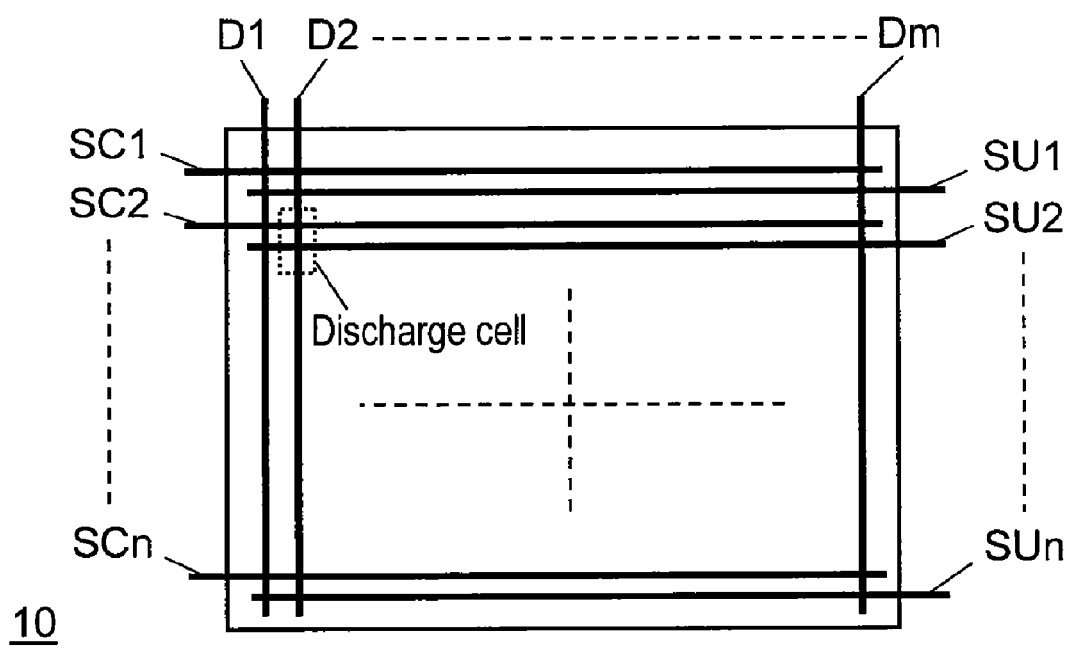
FIG. 2 is an electrode array diagram of the panel of the plasma display device.

FIG. 2 is an electrode array diagram of panel 10 of the plasma display device in accordance with the first exemplary embodiment of the present invention. Panel 10 has n scan electrodes SC1 through SCn (scan electrodes 22 in FIG. 1) and n sustain electrodes SU1 through SUn (sustain electrodes 23 in FIG. 1) both extended in the row direction, and m data electrodes D1 through Dm (data electrodes 32 in FIG. 1) extended in the column direction. A discharge cell is formed in the part where a pair of scan electrode SCi (i is 1 through n) and sustain electrode SUi intersect with one data electrode Dj (j is 1 through m). Thus, m×n discharge cells are formed in the discharge space. Three adjacent discharge cells, which are a discharge cell having red phosphor layer 35R, a discharge cell having green phosphor layer 35G, and a discharge cell having blue phosphor layer 35B, correspond to one pixel when an image is displayed.

Figure 3:
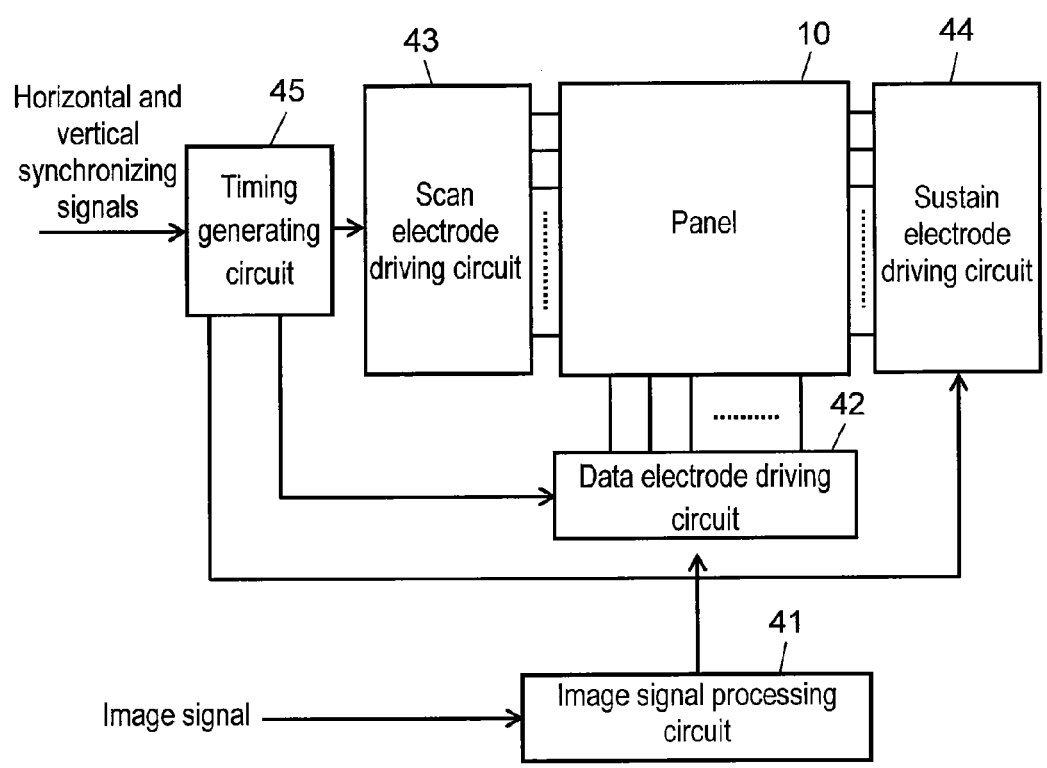
FIG. 3 is a circuit block diagram of the plasma display device.

FIG. 3 is a circuit block diagram of plasma display device 40 in accordance with the first exemplary embodiment of the present invention. Plasma display device 40 has the following elements:
 panel 10;
 image signal processing circuit 41;
 data electrode driving circuit 42;
 scan electrode driving circuit 43;
 sustain electrode driving circuit 44;

timing generating circuit 45; and
a power supply circuit (not shown) for supplying power required for each circuit block.

Image signal processing circuit 41 converts an input image signal into an image signal of each color having the number of pixels and the number of gradations that can be displayed on panel 10 (the detail is described later). Image signal processing circuit 41 converts the light emission and no light emission of a discharge cell in each subfield into image data of each color corresponding to bits "1" and "0" of a digital signal.

Data electrode driving circuit 42 converts the image data of each color output from image signal processing circuit 41 into an address pulse corresponding to each of data electrodes D1 through Dm, and applies the address pulse to each of data electrodes D1 through Dm. Since data electrode driving circuit 42 is formed of a plurality of exclusive ICs because it needs to independently drive many data electrodes 32 based on the image data of each color.

Timing generating circuit 45 generates various timing signals for controlling operations of respective circuit blocks based on a horizontal synchronizing signal and a vertical synchronizing signal, and supplies them to respective circuit blocks. Scan electrode driving circuit 43 and sustain electrode driving circuit 44 generate driving voltage waveforms based on respective timing signals, and apply the waveforms to scan electrodes SC1 through SCn and sustain electrodes SU1 through SUn.

Next, driving voltage waveforms and operation for driving panel 10 are described. In the present embodiment, one field is divided into 10 subfields (SF1, SF2, . . . , SF10), and respective subfields have luminance weights of 1, 2, 3, 6, 11, 18, 30, 44, 60, and 81. In the present embodiment, thus, a later subfield is set to have a larger luminance weight. In the present invention, however, the number of subfields and the luminance weight of each subfield are not limited to the above-mentioned values.

Figure 4:
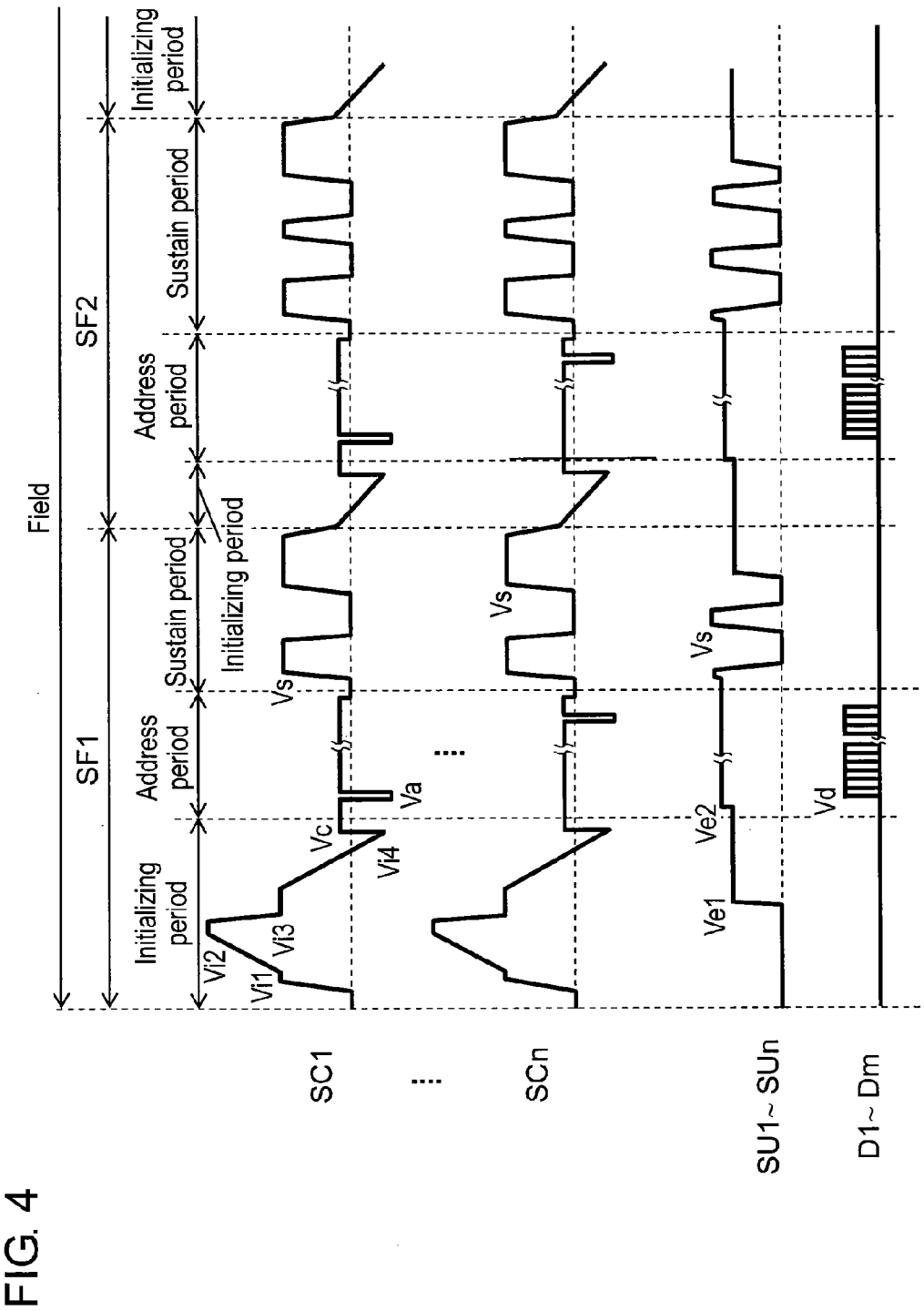
FIG. 4 is a diagram showing a driving voltage waveform of the plasma display device.

FIG. 4 is a diagram showing a driving voltage waveform of plasma display device 40 in accordance with the first exemplary embodiment of the present invention.

In the initializing period, firstly in the first half thereof, data electrodes D1 through Dm and sustain electrodes SU1 through SUn are kept at 0 (V), and a ramp waveform voltage is applied to scan electrodes SC1 through SCn. Here, the ramp waveform voltage gradually rises from voltage Vi1, which is not higher than a discharge start voltage, to voltage Vi2, which is higher than the discharge start voltage. Then, feeble initializing discharge occurs in all discharge cells, and wall voltage is accumulated on scan electrodes SC1 through SCn, sustain electrodes SU1 through SUn, and data electrodes D1 through Dm. Here, the wall voltage of the electrodes means the voltage generated by wall charge accumulated on the dielectric layer for covering the electrodes and phosphor layers.

In the subsequent latter half of the initializing period, sustain electrodes SU1 through SUn are kept at positive voltage Ve1, and a ramp waveform voltage which gradually falls from voltage Vi3 to voltage Vi4 is applied to scan electrodes SC1 through SCn. At this time, feeble initializing discharge occurs again in all discharge cells, and the wall voltage on scan electrodes SC1 through SCn, sustain electrodes SU1 through SUn, and data electrodes D1 through Dm is adjusted to a value appropriate for address operation.

The first half of the initializing period may be omitted in some subfields of all subfields constituting one field. In that case, initializing operation is selectively performed in the discharge cell having undergone sustain discharge in the immediately preceding subfield. FIG. 4 shows a driving voltage waveform where initializing operation having a first half and latter half is performed in the initializing period of SF1, and initializing operation having only latter half is performed in the initializing period of SF2 and later.

In the address period, sustain electrodes SU1 through SUn are kept at voltage Ve2, and voltage Vc is applied to scan electrodes SC1 through SCn. Then, based on the image data of each color, an address pulse of voltage Vd is applied to data electrode Dk (k is 1 through m) of the discharge cell to emit light in the first row, of data electrodes D1 through Dm, and a scan pulse of voltage Va is applied to scan electrodes SC1 of the first row. At this time, address discharge occurs between data electrode Dk and scan electrode SC1 and between sustain electrode SU1 and scan electrode SC1, positive wall voltage is accumulated on scan electrode SC1 of this discharge cell, and negative wall voltage is accumulated on sustain electrode SU1. Thus, the address operation is performed where address discharge is caused in the discharge cell to emit light in the first row to accumulate wall voltage on each electrode. While, address discharge does not occur in the intersecting part of scan electrode SC1 and data electrode Dh (h≠k) having undergone no address pulse. This address operation is sequentially performed until the discharge cell of the n-th row, and the address period is completed.

As discussed above, it is data electrode driving circuit 42 that drives each of data electrodes D1 through Dm. When the panel is seen from the side of data electrode driving circuit 42, each data electrode Dj serves as a capacitive load. Therefore, in the address period, whenever the voltage applied to each data electrode Dj is switched from voltage 0 (V) to voltage Vd, or voltage Vd to voltage 0 (V), this capacitance must be charged and discharged. Increasing the frequency of charge and discharge increases the power consumption of data electrode driving circuit 42.

In the subsequent sustain period, the voltage of sustain electrodes SU1 through SUn is returned to 0 (V), and a sustain pulse of voltage Vs is applied to scan electrodes SC1 through SCn. At this time, in the discharge cell having undergone the address discharge, the voltage between scan electrode SCi and sustain electrode SUi is obtained by adding the wall voltage on scan electrode SCi and that on sustain electrode SUi to voltage Vs, and exceeds the discharge start voltage. Then, sustain discharge occurs between scan electrode SCi and sustain electrode SUi. Negative wall voltage is accumulated on scan electrode SCi, and positive wall voltage is accumulated on sustain electrode SUi.

Subsequently, the voltage of scan electrodes SC1 through SCn is returned to 0 (V), and a sustain pulse of voltage Vs is applied to sustain electrodes SU1 through SUn. At this time, in the discharge cell having undergone the sustain discharge, the voltage between sustain electrode SUi and scan electrode SCi exceeds the discharge start voltage. Therefore, sustain discharge occurs again between sustain electrode SUi and scan electrode SCi, negative wall voltage is accumulated on sustain electrode SUi, and positive wall voltage is accumulated on scan electrode SCi. Hereinafter, similarly, as many sustain pulses as the number corresponding to the luminance weight are applied to scan electrodes SC1 through SCn and sustain electrodes SU1 through SUn, thereby continuously performing sustain discharge in the discharge cell where the address discharge occurs in the address period. In the discharge cell where the address discharge does not occur in the address period, the sustain discharge does not occur, and wall voltage at the completion of the initializing period is kept. Thus, the sustain operation in the sustain period is completed.

Also in subsequent SF2 through SF10, operation similar to that in SF1 is performed except for the number of sustain pulses.

In the subfield method, as discussed above, one field period is constituted by a plurality of subfields having a predetermined luminance weight. A plurality of combinations is selected from arbitrary combinations of the subfields, and a combination set for display is created. Using a combination of the subfields belonging to the combination set for display, the light emission or no light emission in a discharge cell is controlled and gradation is displayed. Hereinafter, the combination set for display created by selecting the plurality of combinations of the subfields is referred to as "coding table". In the present embodiment, a plurality of coding tables of different number of combinations is provided for the image signals of respective colors. These image signals are red image signal sigR (sometimes simply referred to as "sigR"), green image signal sigG (sometimes simply referred to as "sigG"), and blue image signal sigB (sometimes simply referred to as "sigB"). A used coding table is selected according to the signal level of the image signal of each color.

Next, the combination set for display used in the present embodiment, namely the coding table, is described. In order to simplify the description, the gradation when black is displayed is denoted with "0" and the gradation corresponding to luminance weight "N" is denoted with "N" for each of red image signal sigR, green image signal sigG, and blue image signal sigB. Therefore, the gradation of a discharge cell undergoing light emission only in SF1 having luminance weight "1" is "1", and the gradation of a discharge cell undergoing light emission both in SF1 having luminance weight "1" and in SF2 having luminance weight "2" is "3".

FIG. 5A, FIG. 5B, FIG. 5C, and FIG. 5D are diagrams showing coding tables used in plasma display device 40 of the first exemplary embodiment of the present invention. FIG. 5A, FIG. 5B, and FIG. 5C are diagrams showing the first coding table having 90 combinations of the subfields. FIG. 5D is a diagram showing the second coding table having 11 combinations of the subfields. In the present embodiment, one of the two coding tables is selected as each coding table used for the image signal of each color based on the signal level of the image signal of each color.

In FIG. 5A, FIG. 5B, FIG. 5C, and FIG. 5D, the numerical values in the leftmost column show gradations for display used for display. The right side thereof shows whether to emit light in a discharge cell in each subfield when each gradation is displayed, and "0" shows no light emission and "1" shows light emission. For example, in FIG. 5A, light is emitted in the discharge cell only in SF2 in order to display gradation "2", and light is emitted in the discharge cell in SF1, SF2, and SF5 in order to display gradation "14". In order to display gradation "3", there are a method of emitting light in the discharge cell in SF1 and SF2 and a method of emitting light only in SF3. When a plurality of combinations is thus allowed, the combination where light is emitted in subfields of minimum luminance weights is selected. In other words, when gradation "3" is displayed, light is emitted in the discharge cell in SF1 and SF2.

Image signal processing circuit 41 converts the image signal of each color (red image signal sigR, green image signal sigG, or blue image signal sigB) into image data of each color (red image data dataR, green image data dataG, or blue image data dataB). In the image data of each color, the light emission and no light emission in the discharge cell in each subfield correspond to bits "1" and "0" of the digital signal. Therefore, image data "0000000000" showing gradation "0" indicates no light emission in SF1 through SF10, image data "1000000000" showing gradation "1" indicates light emission only in SF1, image data "0100000000" showing gradation "2" indicates light emission only in SF2, and image data "1100000000" showing gradation "3" indicates light emission in SF1 and SF2.

The number of bits different from each other when corresponding bits between two pieces of image data are compared with each other is called hamming distance. For example, the hamming distance between the image data of gradation "0" and the image data of gradation "1" is "1" because corresponding bits in SF1 are not equal to each other. The hamming distance between the image data of gradation "0" and the image data of gradation "3" is "2" because corresponding bits in SF1 and SF2 are not equal to each other. In the right columns of FIG. 5A, FIG. 5B, FIG. 5C, and FIG. 5D show the hamming distances between certain gradations for display and the next smaller gradations for display. Here, the next smaller gradation for display is the highest within the range smaller than the certain gradation for display. For example, the right column of gradation for display "247" shows hamming distance "3" between gradation for display "247" and the next smaller gradation for display "245".

In the first coding table, the hamming distances between adjacent gradations for display are large, their values are "1", "2", or "3", and the average value of them is "1.91". In the second coding table, the hamming distances are the smallest, their values are "1", and the average value of them is also "1.00". In the first coding table and second coding table of the present embodiment, thus, the average value of the hamming distances between certain gradations and the next smaller gradations in the coding table having a small number of combinations is smaller than that in the coding table having a large number of combinations.

When the coding table having the large number of combinations of the subfields is used for displaying an image, the number of displayable gradations increases and hence the representing performance of the image can be improved. When the hamming distances increase, however, switching frequency of the voltage applied to each data electrode Dj from voltage 0 (V) to voltage Vd or from voltage Vd to voltage 0 (V) rises in the address period, and the power consumption of data electrode driving circuit 42 increases.

Therefore, when the coding table having the large number of combinations of the subfields is used, the number of displayable gradations increases and hence the representing performance of the image improves, but the hamming distances between adjacent gradations for display increase to increase the power consumption. In addition, a false contour is also apt to occur. When the coding table having the small number of combinations of the subfields is used, the number of displayable gradations decreases and hence the representing performance of the image degrades. However, in the latter case, the hamming distances between adjacent gradations for display decrease to suppress the power consumption. In addition, a false contour hardly occurs.

Therefore, for an image signal where the image display quality does not reduce even if the number of displayable gradations is small, using the coding table having the small number of combinations of the subfields for this image signal can suppress the power consumption of the data electrode driving circuit. In the present embodiment, the signal levels of image signals of respective colors are compared with each other, and the coding table having the large number of displayable gradations is used for the image signal of the color having a relatively large signal level, thereby securing the image display quality.

For the image signal of the color that has a relatively low signal level, the image display quality does not significantly reduce even if the number of displayable gradations is small, and hence the coding table having the small number of combinations of the subfields is used to suppress the power consumption. Thus, respective signal levels of red image signal sigR, green image signal sigG, and blue image signal sigB are compared with each other. For the image signal of a color that has a relatively low signal level, the following combination set for display is used. In this combination set, the number of combinations is smaller than that in the combination set for display used for the image signal of a color that has a relatively high signal level. Thus, the electric power is reduced without sacrificing the image display quality.

Specifically, attention is firstly focused on red image signal sigR. The signal level of red image signal sigR is compared with the signal level of green image signal sigG. For red image signal sigR where the ratio of the signal level to that of green image signal sigG is smaller than a predetermined constant Kr, the following combination set for display is used. In this combination set, the number of combinations is smaller than that in the combination set for display used for red image signal sigR where the ratio of the signal level to that of green image signal sigG is the predetermined constant Kr or larger.

In other words, red image signal sigR is compared with green image signal sigG. The first coding table is used for red image signal sigR in a region satisfying $$sigG \times Kr \leq sigR. \quad \text{(condition R1)}$$

The second coding table is used for red image signal sigR in a region satisfying $$sigR < sigG \times Kr. \quad \text{(condition R2)}$$

Here, predetermined constant Kr is a constant set for red image signal sigR, and Kr=0.75 in the present embodiment.

Attention is then focused on green image signal sigG. The signal level of green image signal sigG is compared with that of red image signal sigR and that of blue image signal sigB. For green image signal sigG where the ratio of the signal level to the higher one of the signal levels of red image signal sigR and blue image signal sigB is smaller than a predetermined constant Kg, the following combination set for display is used. In this combination set, the number of combinations is smaller than that in the combination set for display used for green image signal sigG where the ratio of the signal level to the higher one of the signal levels of red image signal sigR and blue image signal sigB is the predetermined constant Kg or larger.

In other words, red image signal sigR, green image signal sigG, and blue image signal sigB are compared with each other. The first coding table is used for green image signal sigG in a region satisfying $$\max(sigR,sigB) \times Kg \leq sigG. \quad \text{(condition G1)}$$

Here, max (A, B) means selection of the higher one of numerical values A and B.

The second coding table is used for green image signal sigG in a region satisfying $$sigG < \max(sigR,sigB) \times Kg. \quad \text{(condition G2)}$$

Here, predetermined constant Kg is a constant set for green image signal sigG, and Kg=0.25 in the present embodiment.

Attention is then focused on blue image signal sigB. The signal level of blue image signal sigB is compared with that of green image signal sigG. For blue image signal sigB where the ratio of the signal level to that of green image signal sigG is smaller than a predetermined constant Kb, the following combination set for display is used. In this combination set, the number of combinations is smaller than that in the combination set for display used for blue image signal sigB where the ratio of the signal level to that of green image signal sigG is the predetermined constant Kb or larger.

In other words, blue image signal sigB is compared with green image signal sigG. The first coding table is used for blue image signal sigB in a region satisfying $$sigG \times Kb \leq sigB. \quad \text{(condition B1)}$$

The second coding table is used for blue image signal sigB in a region satisfying $$sigB < sigG \times Kb. \quad \text{(condition B2)}$$

Here, predetermined constant Kb is a constant set for blue image signal sigB, and Kb=0.75 in the present embodiment.

Figure 6:
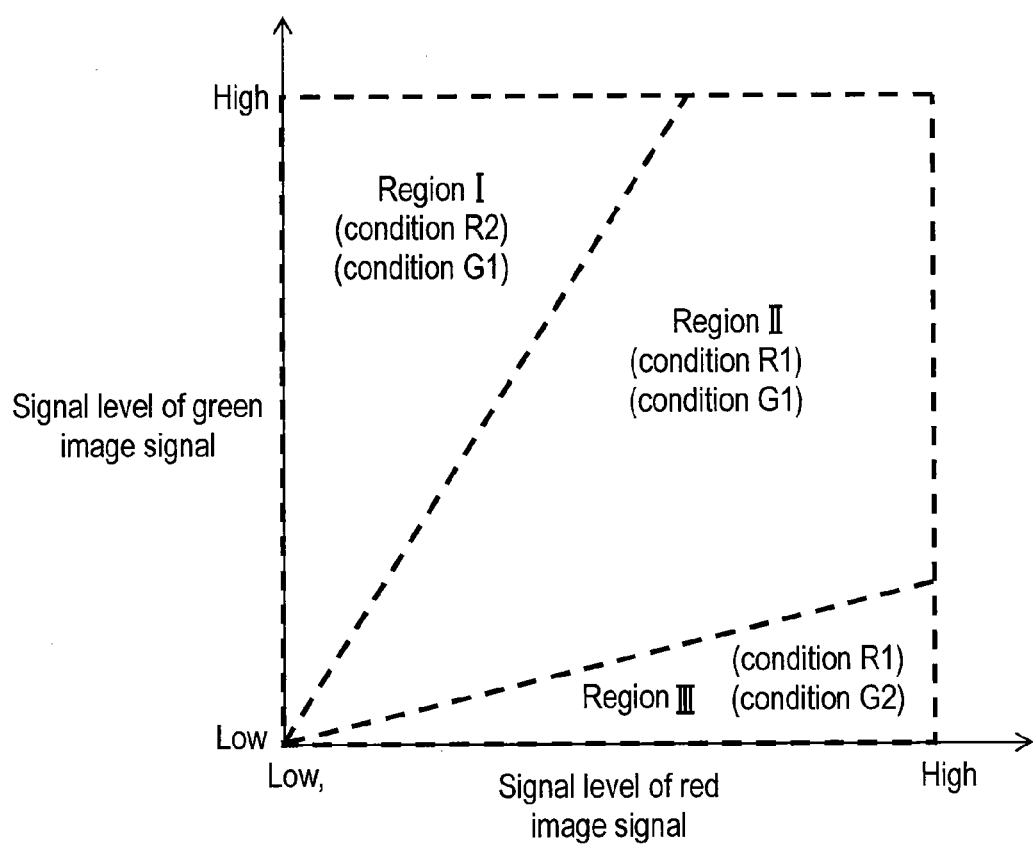
FIG. 6 is a schematic diagram showing the selective use of the coding tables of the plasma display device.

FIG. 6 is a schematic diagram showing the selective use of the coding tables of plasma display device 40 in accordance with the first exemplary embodiment of the present invention. The horizontal axis shows the signal level of red image signal sigR, and the vertical axis shows the signal level of green image signal sigG. To make the diagram easy-to-understand, the signal level of blue image signal sigB is assumed to be "0".

Regarding an image signal in region I of FIG. 6, the signal level of red image signal sigR is relatively smaller than that of green image signal sigG, and (condition R2) and (condition G1) are satisfied. Therefore, the second coding table is used for red image signal sigR, and the first coding table is used for green image signal sigG. Regarding an image signal in region II, there is not large difference between the signal levels of red image signal sigR and green image signal sigG, and (condition R1) and (condition G1) are satisfied. Therefore, the first coding table is used for red image signal sigR and green image signal sigG. Regarding an image signal in region III, the signal level of green image signal sigG is relatively smaller than that of red image signal sigR, and (condition R1) and (condition G2) are satisfied. Therefore, the second coding table is used for green image signal sigG, and the first coding table is used for red image signal sigR.

In the present embodiment, among the image signals of respective colors, the second coding table is thus used for a signal where relative signal level is low and the display quality of the image does not reduce even when the number of displayable gradations decreases. Thus, the electric power is reduced without sacrificing the image display quality.

When the signal levels of the image signals of respective colors are equal to each other, the green light emission has the highest luminance comparing with the red light emission and blue light emission, the visual sensitivity to the gradation is also the highest. In the present embodiment, in consideration of the above-mentioned discussion, a coding table used for red image signal sigR is selected by comparing red image signal sigR with green image signal sigG, and a coding table used for blue image signal sigB is selected by comparing blue image signal sigB with green image signal sigG.

Figure 7:
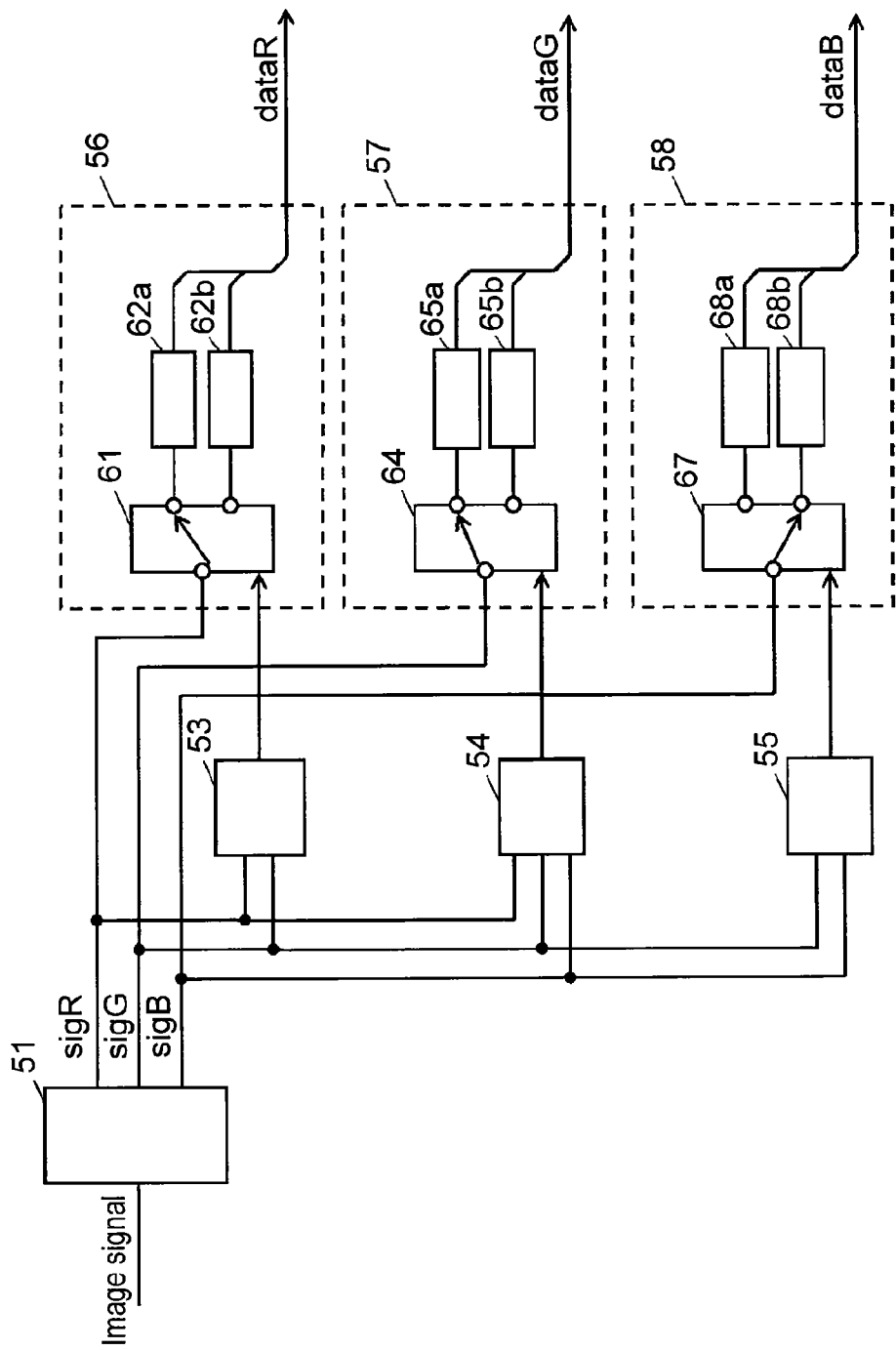
FIG. 7 is a circuit block diagram showing the detail of an image signal processing circuit of the plasma display device.

A method of switching the coding tables based on the image signals of respective colors in the present embodiment is described in detail. FIG. 7 is a circuit block diagram showing the detail of image signal processing circuit 41 of plasma display device 40 in accordance with the first exemplary embodiment of the present invention. Image signal processing circuit 41 has color separating section 51, R comparing section 53, G comparing section 54, B comparing section 55, R data converting section 56, G data converting section 57, and B data converting section 58.

Color separating section 51 separates an input image signal such as a National Television Standards Committee (NTSC) image signal into three primary colors, namely red image signal sigR, green image signal sigG, and blue image signal sigB. When image signals of respective colors are input as input image signals, color separating section 51 may be omitted.

R comparing section 53 compares constant times green image signal sigG with red image signal sigR using the predetermined constant Kr set for red image signal sigR. The value of constant Kr is "0.75" in the present embodiment. A signal indicating which of (condition R1) and (condition R2) is satisfied is output as the comparison result to R data converting section 56.

G comparing section 54 compares constant times the higher one of red image signal sigR and blue image signal sigB with green image signal sigG using the predetermined constant Kg set for green image signal sigG. The value of constant Kg is "0.25" in the present embodiment. A signal indicating which of (condition G1) and (condition G2) is satisfied is output as the comparison result to G data converting section 57.

B comparing section 55 compares constant times green image signal sigG with blue image signal sigB using the predetermined constant Kb set for blue image signal sigB. The value of constant Kb is "0.75" in the present embodiment. A signal indicating which of (condition B1) and (condition B2) is satisfied is output as the comparison result to B data converting section 58.

R data converting section 56 has coding selecting section 61 and two coding tables 62*a* and 62*b*, and converts red image signal sigR into red image data dataR. Here, red image data dataR is a combination of subfields for controlling light emission or no light emission of a red discharge cell.

Coding selecting section 61 selects one of two coding tables 62*a* and 62*b* based on the comparison result of R comparing section 53. Specifically, coding selecting section 61 selects first coding table 62*a* in a region satisfying (condition R1), and selects second coding table 62*b* in a region satisfying (condition R2). Each of coding tables 62*a* and 62*b* is constituted by a data converting table in a read only memory (ROM) or the like, and converts input red image signal sigR into red image data dataR.

G data converting section 57 has coding selecting section 64 and two coding tables 65*a* and 65*b*, and converts green image signal sigG into green image data dataG. B data converting section 58 has coding selecting section 67 and two coding tables 68*a* and 68*b*, and converts blue image signal sigB into blue image data dataB. The function of each circuit block is substantially the same as each circuit block corresponding to R data converting section 56, so that detailed descriptions are omitted.

Coding tables 62*a*, 65*a*, and 68*a* are the first coding table shown in FIG. 5A, FIG. 5B, and FIG. 5C. Coding tables 62*b*, 65*b*, and 68*b* are the second coding table shown in FIG. 5D.

In such a structure, the signal levels of a red image signal, green image signal, and blue image signal are compared with each other. An image signal of a color that has a low signal level can control the light emission or no light emission of the discharge cell using the following combination set for display. In this combination set, the number of combinations of subfields is smaller than that in the combination set for display used for the image signal of a color that has a high signal level.

In the present embodiment, as each coding table used for the image signal of each color, one coding table is selected and used from two coding tables based on the signal level of the image signal of each color. However, the present invention is not limited to this. For example, three or more coding tables may be disposed for the image signal of each color, and one coding table may be selected and used from three or more coding tables based on the signal level of the image signal of each color. The coding tables may be selectively used in consideration of not only the signal level of the image signal of each color but also another attribute such as motion of the image. A circuit for displaying gradation that is not included in the gradations for display may be added. One example thereof is hereinafter described as a second exemplary embodiment.

Second Exemplary Embodiment

The structure of panel 10 and the driving voltage waveforms applied to the electrodes are the same as those of the first exemplary embodiment, so that descriptions of them are omitted. In the second exemplary embodiment, each coding table used for the image signal of each color is selected and used from four coding tables.

FIG. 8A, FIG. 8B, FIG. 8C, FIG. 8D, FIG. 8E, and FIG. 8F are diagrams showing coding tables used in plasma display device 40 in accordance with the second exemplary embodiment of the present invention. FIG. 8A and FIG. 8B show a first coding table having 90 combinations of subfields, and this coding table is the same as the first coding table shown in FIG. 5A, FIG. 5B, and FIG. 5C. FIG. 8C and FIG. 8D show a second coding table having 44 combinations of subfields, and FIG. 8E shows a third coding table having 20 combinations of subfields. FIG. 8F shows a fourth coding table having 11 combinations of subfields, and this coding table is the same as the second coding table shown in FIG. 5D.

In the first coding table, the hamming distances between adjacent gradations for display are the largest, their values are "1", "2", or "3", and the average value of them is "1.91". In the second coding table, the hamming distances are "1" or "2", "2" appears more frequently, and the average value of them is "1.77". In the third coding table, the hamming distances are "1" or "2", the appearing frequency of "2" is substantially the same as that of "1", and the average value of them is "1.47". In the fourth coding table, the hamming distances are the smallest, their values are "1", and the average value of them is also "1.00". Also in the present embodiment, the average value of the hamming distances between certain gradations and the next smaller gradations in the coding table that has a small number of combinations is smaller than that in the coding table that has a large number of combinations.

As discussed above, when a coding table having a large number of combinations of the subfields is used, the number of displayable gradations increases and hence the representing performance of the image improves, but the hamming distances between adjacent gradations for display increase to increase the power consumption. In addition, a false contour is apt to occur. When the coding table having a small number of combinations of the subfields is used, the number of displayable gradations decreases and hence the representing performance of the image degrades. However, in the latter case, the hamming distances between adjacent gradations for display decrease to suppress the power consumption. In addition, a false contour hardly occurs.

In the present embodiment, for an image signal of a large signal level, the following coding table is used to prioritize the representing performance of an image. The coding table has a larger number of combinations of the subfields in a region where a still image or an image slow in motion is displayed than in a region where an image fast in motion is displayed. Here, the still image or the image slow in motion has high visual sensitivity to the gradation. In addition, the still image or the image slow in motion is hereinafter, collectively referred to as "still image", and the image fast in motion is hereinafter referred to as "moving image". In other words, for an image signal displaying a moving image, the combination set for display is used where the number of combinations is smaller than that in the combination set for display used for an image signal for displaying the still image.

Specifically, attention is firstly focused on red image signal sigR. Red image signal sigR is compared with green image signal sigG. The first coding table is used for red image signal sigR in a region satisfying $$\mathrm{sig}G \times Kr \leq \mathrm{sig}R \text{ and displaying a still image.} \quad \text{(condition R1)}$$

The second coding table is used for red image signal sigR in a region satisfying $$\mathrm{sig}G \times Kr1 \leq \mathrm{sig}R \text{ and displaying a moving image.} \quad \text{(condition R2)}$$

The third coding table is used for red image signal sigR in a region satisfying $$\mathrm{sig}G \times Kr2 \leq \mathrm{sig}R < \mathrm{sig}G \times Kr1. \quad \text{(condition R3)}$$

The fourth coding table is used for red image signal sigR in a region satisfying $$\mathrm{sig}R < \mathrm{sig}G \times Kr2. \quad \text{(condition R4)}$$

Here, the predetermined constants Kr1 and Kr2 are set for red image signal sigR, and Kr1=1.5 and Kr2=0.75 in the present embodiment.

Attention is then focused on green image signal sigG. Red image signal sigR, green image signal sigG, and blue image signal sigB are compared with each other. The first coding table is used for green image signal sigG in a region satisfying $$\max(\mathrm{sig}R, \mathrm{sig}B) \times Kg1 \leq \mathrm{sig}G \text{ and displaying a still image.} \quad \text{(condition G1)}$$

The second coding table is used for green image signal sigG in a region satisfying $$\max(\mathrm{sig}R, \mathrm{sig}B) \times Kg1 \leq \mathrm{sig}G \text{ and displaying a moving image.} \quad \text{(condition G2)}$$

The third coding table is used for green image signal sigG in a region satisfying $$\max(\mathrm{sig}R, \mathrm{sig}B) \times Kg2 \leq \mathrm{sig}G < \max(\mathrm{sig}R, \mathrm{sig}B) \times Kg1. \quad \text{(condition G3)}$$

The fourth coding table is used for green image signal sigG in a region satisfying $$\mathrm{sig}G < \max(\mathrm{sig}R, \mathrm{sig}B) \times Kg2. \quad \text{(condition G4)}$$

Here, the predetermined constants Kg1 and Kg2 are set for green image signal sigG, and Kg1=0.5 and Kg2=0.25 in the present embodiment.

Attention is then focused on blue image signal sigB. Blue image signal sigB is compared with green image signal sigG. The first coding table is used for blue image signal sigB in a region satisfying $$\mathrm{sig}G \times Kb1 \leq \mathrm{sig}B \text{ and displaying a still image.} \quad \text{(condition B1)}$$

The second coding table is used for blue image signal sigB in a region satisfying $$\mathrm{sig}G \times Kb1 \leq \mathrm{sig}B \text{ and displaying a moving image.} \quad \text{(condition B2)}$$

The third coding table is used for blue image signal sigB in a region satisfying $$\mathrm{sig}G \times Kb2 \leq \mathrm{sig}B < \mathrm{sig}G \times Kb1. \quad \text{(condition B3)}$$

The fourth coding table is used for blue image signal sigB in a region satisfying $$\mathrm{sig}B < \mathrm{sig}G \times Kb2. \quad \text{(condition B4)}$$

Here, the predetermined constants Kb1 and Kb2 are set for blue image signal sigB, and Kb1=1.5 and Kb2=0.75 in the present embodiment.

In the present embodiment, among the image signals of respective colors, the fourth coding table is thus used for a signal where the signal level is low and the image display quality does not degrade even when the number of displayable gradations decreases. The fourth coding table has the least number of combinations of the subfields, and has the least number of gradations for display. In the fourth coding table, however, the hamming distances between certain gradations and the next smaller gradations, namely the hamming distances between adjacent gradations for display, are small, and the power consumption of data electrode driving circuit 42 becomes the least.

The first coding table is used for a signal where the image is a still image, the signal level is high, and the image display quality degrades when the number of displayable gradations is excessively reduced. The second coding table is used for a signal where the image is a moving image, the signal level is high, and the image display quality degrades when the number of displayable gradations is excessively reduced. In the first coding table and the second coding table, some hamming distances between adjacent gradations for display are large, and the effect of reducing the power consumption is small. However, since the number of gradations for display is large, the image can be displayed without reducing the image display quality. The third coding table has an intermediate characteristic between the second coding table and the fourth coding table, and is used for a signal where the signal level is slightly low and the image display quality degrades to some extent when the number of displayable gradations is decreased, among image signals of respective colors.

Thus, the electric power is suppressed steadily without sacrificing the image display quality in the present embodiment.

Figure 9:
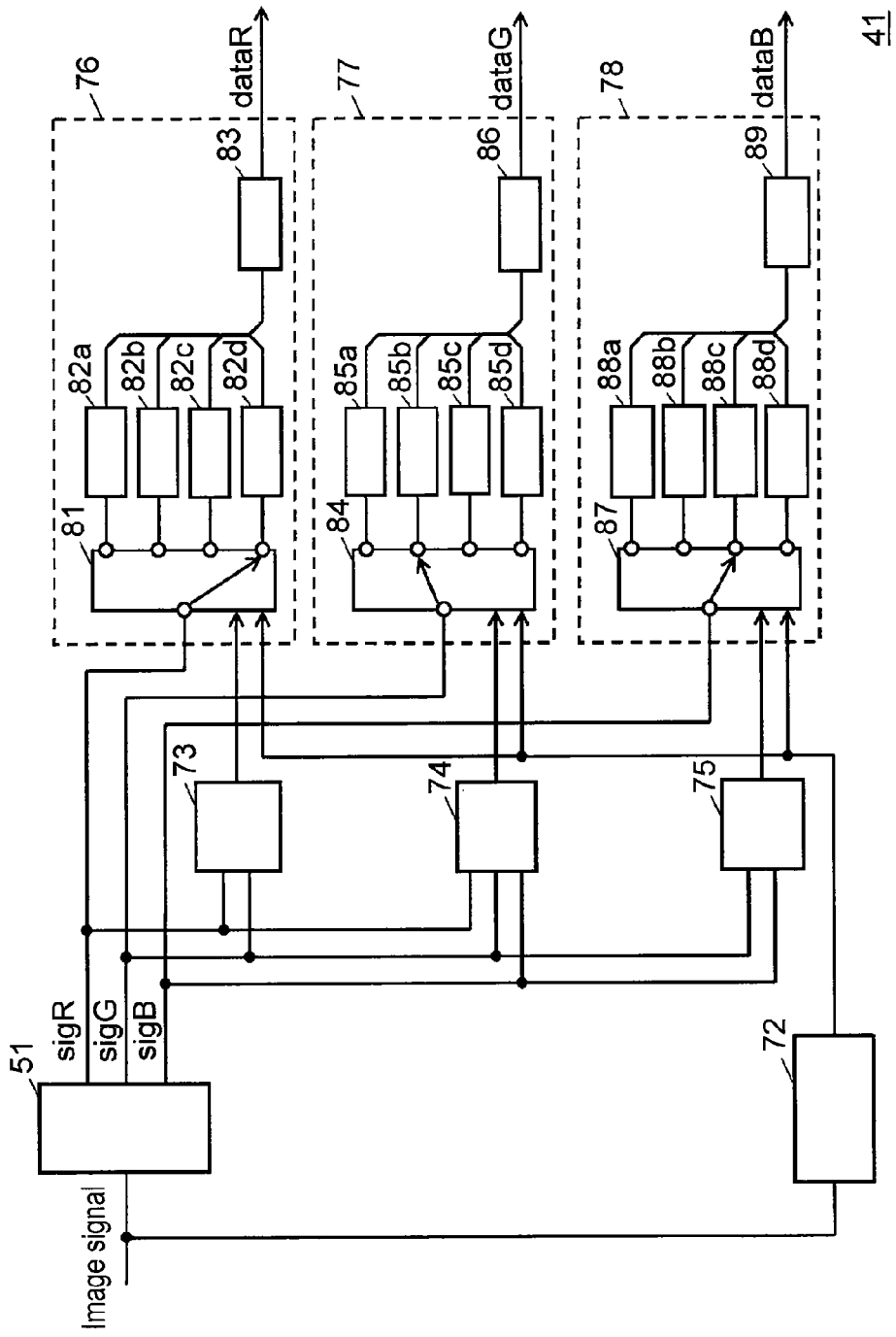
FIG. 9 is a circuit block diagram showing the detail of an image signal processing circuit of the plasma display device.

A method of switching the coding tables based on the image signals in the present embodiment is described in detail. FIG. 9 is a circuit block diagram showing the detail of image signal processing circuit 41 of plasma display device 40. Image signal processing circuit 41 has color separating section 51, motion detecting section 72, R comparing section 73, G comparing section 74, B comparing section 75, R data converting section 76, G data converting section 77, and B data converting section 78.

Color separating section 51 is the same as color separating section 51 of the first embodiment.

Motion detecting section 72 has a frame memory and a differential circuit, for example. Motion detecting section 72 calculates the difference between image signals of frames, detects an image as a moving image when the absolute value is a predetermined value or larger or the image as a still image when the absolute value is smaller than the predetermined value, and outputs the result to R data converting section 76, G data converting section 77, and B data converting section 78. In FIG. 9, motion detecting section 72 is assumed to input a composite image signal such as an NTSC image signal. However, when image signals of respective colors are input as image signals, motion detecting section 72 inputs these image signals and detects the motion of the image.

R comparing section 73 compares red image signal sigR with constant times green image signal sigG using predetermined constants Kr1 and Kr2 set for red image signal sigR. In the present embodiment, two constants Kr1 and Kr2 are set, and their values are "1.5" and "0.75", respectively. R comparing section 73 outputs, as a comparison result, a signal indicating which of (condition R1), (condition R2), (condition R3), and (condition R4) is satisfied to R data converting section 76.

G comparing section 74 compares green image signal sigG with constant times the higher one of red image signal sigR and blue image signal sigB using predetermined constants Kg1 and Kg2 set for green image signal sigG. In the present embodiment, two constants Kg1 and Kg2 are set, and their values are "0.5" and "0.25", respectively. G comparing section 74 outputs, as a comparison result, a signal indicating which of (condition G1), (condition G2), (condition G3), and (condition G4) is satisfied to G data converting section 77.

B comparing section 75 compares blue image signal sigB with constant times green image signal sigG using predetermined constants Kb1 and Kb2 set for blue image signal sigB. In the present embodiment, two constants Kb1 and Kb2 are set, and their values are "1.5" and "0.75", respectively. B comparing section 75 outputs, as a comparison result, a signal indicating which of (condition B1), (condition B2), (condition B3), and (condition B4) is satisfied to B data converting section 78.

R data converting section 76 has coding selecting section 81, four coding tables 82a, 82b, 82c, and 82d, and error diffusion processing section 83. R data converting section 76 converts red image signal sigR into red image data dataR.

Coding selecting section 81 selects one from four coding tables 82a, 82b, 82c, and 82d based on the detection output of the motion detected by motion detecting section 72 and the comparison result of R comparing section 73. Specifically, coding selecting section 81 selects first coding table 82a when (condition R1) is satisfied, second coding table 82b when (condition R2) is satisfied, third coding table 82c when (condition R3) is satisfied, or fourth coding table 82d when (condition R4) is satisfied.

Each of coding tables 82a, 82b, 82c, and 82d is constituted using a data converting table in a ROM or the like, and converts input red image signal sigR into red image data.

Error diffusion processing section 83 is disposed for falsely displaying a gradation that cannot be displayed on the coding tables, applies error diffusion processing and dither processing to the red image data, and outputs the processed red image data as red image data dataR.

G data converting section 77 has coding selecting section 84 and four coding tables 85a, 85b, 85c, and 85d, and error diffusion processing section 86, and converts green image signal sigG into green image data dataG. The function of each circuit block is substantially the same as each corresponding circuit block of R data converting section 76, so that detailed descriptions are omitted.

B data converting section 78 has coding selecting section 87, four coding tables 88a, 88b, 88c, and 88d, and error diffusion processing section 89, and converts blue image signal sigB into blue image data dataB. The function of each circuit block is substantially the same as each corresponding circuit block of R data converting section 76.

Here, coding tables 82a, 85a, and 88a are the first coding table shown in FIG. 8A and FIG. 8B. Coding tables 82b, 85b, and 88b are the second coding table shown in FIG. 8C and FIG. 8D. Coding tables 82c, 85c, and 88c are the third coding table shown in FIG. 8E. Coding tables 82d, 85d, and 88d are the fourth coding table shown in FIG. 8F.

The number of coding tables is two in the first exemplary embodiment, and the number of coding tables is four in the second exemplary embodiment. However, the present invention is not limited to this. A plurality of coding tables other than them may be switched and used.

In the present invention, the number of subfields and luminance weight of each subfield are not limited to the above-mentioned values. The specific numerical values or the like used in the above-mentioned embodiments are simply one example, and are preferably set to the optimal values according to the characteristic of a panel or specification of the plasma display device.

INDUSTRIAL APPLICABILITY

The present invention can reduce the power consumption of a data electrode driving circuit without sacrificing the image display quality, and hence is useful as a driving method of a plasma display device.

REFERENCE MARKS IN THE DRAWINGS 10 panel
22 scan electrode
23 sustain electrode
24 display electrode pair
32 data electrode
40 plasma display device
41 image signal processing circuit
42 data electrode driving circuit
43 scan electrode driving circuit
44 sustain electrode driving circuit
45 timing generating circuit
51 color separating section
53, 73 R comparing section
54, 74 G comparing section
55, 75 B comparing section
56, 76 R data converting section
57, 77 G data converting section
58, 78 B data converting section
61, 64, 67, 81, 84, 87 coding selecting section
62a, 62b, 65a, 65b, 68a, 68b, 82a, 82b, 82c, 82d, 85a, 85b, 85c, 85d, 88a, 88b, 88c, 88d coding table
72 motion detecting section
83, 86, 89 error diffusion processing section
sigB blue image signal
sigG green image signal
sigR red image signal

The invention claimed is:

1. A driving method of a plasma display device comprising:
constituting one field period by a plurality of subfields having a predetermined luminance weight;
selecting a plurality of combinations of the subfields to create at least a first coding table and a second coding table for display, each of the first coding table and the second coding table have a different number of combinations; and
controlling light emission or no light emission in a discharge cell and displaying gradation, using the first coding table and the second coding table for display,
wherein respective signal levels of a red image signal, a green image signal, and a blue image signal are compared with each other, and,
wherein the first coding table is selected for an image signal of a color that has a relatively low signal level lower than a first threshold, the second coding table is selected for an image signal of a color that has a relatively high signal level higher than a second threshold, the number of combinations in the first coding table being smaller than the number of combinations in the second coding table.

2. The driving method of a plasma display device of claim 1, wherein
the average value of hamming distances between certain gradations and the next smaller gradations in the first coding table for display that has a small number of combinations is smaller than the average value of hamming distances between certain gradations and the next smaller gradations in the second coding table for display that has a large number of combinations.

3. The driving method of a plasma display device of claim 1, wherein
a signal level of a red image signal is compared with a signal level of a green image signal, and,
the first coding table for display is used for the red image signal where the ratio to the green image signal is smaller than a predetermined constant, the number of combinations in the first coding table for display being smaller than that in the second coding table for display used for the red image signal where the ratio to the green image signal is the predetermined constant or larger.

4. The driving method of a plasma display device of claim 1, wherein
a signal level of a green image signal, a signal level of a red image signal, and a signal level of a blue image signal are compared with each other, and
the first coding table for display is used for the green image signal where the ratio to the higher one of the red image signal and the blue image signal is smaller than a predetermined constant, the number of combinations in the first coding table for display being smaller than that in the second coding table for display used for the green image signal where the ratio to the higher one of the red image signal and the blue image signal is the predetermined constant or larger.

5. The driving method of a plasma display device of claim 1, wherein
a signal level of a blue image signal is compared with a signal level of a green image signal, and,
the first coding table for display is used for the blue image signal where the ratio to the green image signal is smaller than a predetermined constant, the number of combinations in the first coding table for display being smaller than that in the second coding table for display used for the blue image signal where the ratio to the green image signal is the predetermined constant or larger.

6. The driving method of a plasma display device of claim 1, wherein
the first coding table for display is used for an image signal for displaying a moving image, the number of combinations in the first coding table for display being smaller than that in the second coding table for display used for an image signal for displaying a still image.

\* \* \* \* \*